(12) United States Patent
Uang

(10) Patent No.: US 8,557,349 B2
(45) Date of Patent: Oct. 15, 2013

(54) ELASTOMERIC PAINT WITH PROTECTIVE COATING UPON STYRENIC BLOCK COPOLYMER ARTICLES

(75) Inventor: Yuh-Jye Uang, Chesterfield, MO (US)

(73) Assignee: Apex Materials Corporation, St. Louis, MO (US)

( * ) Notice: Subject to any disclaimer, the term of this patent is extended or adjusted under 35 U.S.C. 154(b) by 830 days.

(21) Appl. No.: 12/456,215

(22) Filed: Jun. 12, 2009

(65) Prior Publication Data

US 2010/0316803 A1   Dec. 16, 2010

(51) Int. Cl.
*B05D 7/02*   (2006.01)
*B05D 1/02*   (2006.01)

(52) U.S. Cl.
CPC ... *B05D 7/02* (2013.01); *B05D 1/02* (2013.01)
USPC .................. 427/412.1; 427/412.3; 427/421.1; 427/429

(58) Field of Classification Search
CPC .................................... B05D 7/02; B05D 1/02
USPC .......................... 427/412.1, 412.3, 421.1, 429
See application file for complete search history.

(56) References Cited

U.S. PATENT DOCUMENTS

| 3,519,466 | A | | 7/1970 | Akamatsu et al. |
| 3,991,002 | A | | 11/1976 | Sadlo |
| 4,407,871 | A | * | 10/1983 | Eisfeller ......................... 428/31 |
| 4,431,711 | A | * | 2/1984 | Eisfeller ......................... 428/31 |
| 5,334,646 | A | | 8/1994 | Chen |
| 6,367,384 | B1 | | 4/2002 | Cass |
| 6,503,569 | B2 | | 1/2003 | Sneddon |
| 7,001,947 | B2 | | 2/2006 | Cordova |
| 8,091,227 | B2 | * | 1/2012 | Hong ........................... 29/889.1 |

FOREIGN PATENT DOCUMENTS

EP   0239890   10/1987

* cited by examiner

*Primary Examiner* — William Phillip Fletcher, III
(74) *Attorney, Agent, or Firm* — Paul M Denk

(57) ABSTRACT

A process for forming a protective sealant and coating onto a thermoplastic elastic substrate forming an article, including applying a paint coating composition to the surface of the elastomeric formed article, to provide a permanent printed coating thereon, and the step of applying a top coat treatment onto the paint coating composition as previously applied onto the thermoplastic elastomeric substrate forming the article.

6 Claims, No Drawings

ELASTOMERIC PAINT WITH PROTECTIVE COATING UPON STYRENIC BLOCK COPOLYMER ARTICLES

FIELD OF INVENTION

The present invention relates to a novel solvent based of elastomeric paints and protective coating composition including a major amount of mixture of solvents and minor amount of polymers, cyanoacrylate, mineral oils, pigments, and additives. The coating process can be applied by pad printing, screen printing, brush, and spray. The solvent based elastomeric protective coating composition provides scratch resistance between top coat treatment and painted surface of styrenic block copolymer articles.

BACKGROUND OF THE INVENTION

In recent years, more and more commercial thermoplastic elastomeric products are formed into power tools, electronic and telecommunication equipment, personal care, housewares and appliances, sporting goods, medical devices, industrial machines, packaging, food and beverages, and toys and games. The key features of a thermoplastic elastomer include softness, flexibility, and elasticity, excellent grip characteristics, and good weatherability. These features attract the interest of users and consumers. However, the styrenic block copolymer of thermoplastic compounds contains mineral oil and non-polar polypropylene which have little surface energy. Because the surface of compounds is non-polar, permanent marking becomes difficult to achieve by conventional application methods such as pad printing, screen printing, hot foiling, hand painting and spray coating. The styrenic block copolymer can be commercial grade as soft as 30 shore 00 (near 0 shore A) and as hard as 90 shore A. In general, the composition of the softer grade styrenic block copolymer contains higher amounts of mineral oil only. However, the composition of the harder grade styrenic block copolymer contains more propylene and less mineral oil. The high oil absorbent styrenic block copolymer products have excellent elasticity and elongation but high sensitivity to solvents. If the elongation of elastomeric paint film is much lower than that of the decorated substrate, the applied decorated image will rub off after stretching the substrate.

DESCRIPTION OF THE PRIOR ART

In the prior art, some have approached the paint coating at the surface of styrenic block copolymer. However, the prior art provides limited information regarding the solvent corrosion effect at the substrate surface. Also, no prior art described the scratch resistance of the paint coating when protected by a top coat treatment at the surface of styrenic block copolymer.

U.S. Pat. No. 3,519,466 to Akamatsu, et al., discloses a process for printing on molded articles of a thermoplastic resin or a rubber. This process heats an ink containing a benzene-soluble reactive dye and a wetting agent soluble in benzene in contact with the surface of the molded article of an organo-metallic compound. When the article reaches a temperature over 50° C., but lower than the softening point of the article, the dye will permeate the article and react with the organo-metallic compound to become fixed therein.

The U.S. Pat. No. 6,367,384 to Cass reveals a process for printing a four-color image directly onto a fishing lure. The process begins by preparing the soft bait fishing lure to receive the ink. By employing a four-color pad printing machine, the process prints a four-color image on one side of the fishing lure and may turn over the lure to print on the other side. This process requires pretreatment of the printing articles and an optional clear top coat application upon the lure.

The U.S. Pat. No. 3,991,002 to Sadlo discloses that oily or other difficult-to-adhere surfaces become receptive to a pressure-sensitive adhesive when sprayed, or coated, with an organic solvent solution or dispersion of a certain rubbery styrenic block copolymer and large amount of thermoplastic resin.

The U.S. Pat. No. 5,334,646 to Chen discloses a gelatinous composition and articles formed from an admixture of styrenic block copolymer and plasticizing oil. The gelatinous articles have high elongation, tensile strength, and excellent shape retention under extreme deformation. These properties become essential for the gelatinous composition when used as toys, therapeutic hand exercising grip, shock absorbers, and the like.

The European Patent Application EP0239890 to Blomquist discloses an opaque cyanoacrylate adhesive or coating composition that has a monomeric ester of 2-cyanoacrylic acid and 5% to 50% by weight, based on the monomeric ester, of semi-compatible plasticizers. Plasticizers, useful as opacifiers, come from a non-hydrogen bonding solvent or a moderately hydrogen bonding solvent.

The U.S. Pat. No. 6,503,569 to Sneddon reveals an invention directed to resin coating, adhesives, and cement compositions of styrenic copolymers and terpene solvents. The composition form has high adhesion bonding with molded elastomeric styrene copolymer surface substrates. The invention also has a method of applying the instant coating to substrate surfaces.

The U.S. Pat. No. 7,001,947 to Cordova shows a cyanoacrylate adhesive composition having high shear bond strength, peeling bond strength, tensile strength, impact bond strength, and superior wear characteristics particularly in toy applications. The cyanoacrylate adhesive composition contains (a) up to 20% by weight of cyanoacrylate monomer, (b) a styrene-based elastomeric block copolymer, and (c) a specific solvent which is selected to effect the solution of both components.

The currently available methods to apply images onto thermoplastic rubber compounds include either hand painting or spray coating. Because the composition of thermoplastic rubber compounds contains up to 80% mineral oil, a formed coating film has extreme difficulty sticking to the surface of the substrate due to the non-polar oily substance surface. The prior art thermoplastic elastomer gel articles have good tensile strength and elongation. The prior art make paints by dissolving styrene polymers with solvents alone. Commercial thermoplastic elastomer products have the different durameter from shore 00 to 80 durameter A produced by varying the ratio between styrenic copolymer and mineral oil. With a different amount of mineral oil in the coating composition, the strength of a formed elastomeric gel film varies depending on the elongation of the coating substrate substance. Currently the composition of commercial molded products contains a styrenic block copolymer and mineral oil. Most problems occur when attempting to apply the protective coating to the painting surface of substance and where the cracking and melting of the surface substrate risks the compatibility between the coating film and the molded products. The mineral oil, though, must be in the coating composition which will have more compatibility with molded products. During application of the paint coating, the high polar solvents such as ester and ketone should be avoided. Those solvents will dissolve the surface substrate of molded soft styrenic copolymer products and cause the cracking or melting of the substrate surface. The formed painting film will stretch, strain, and impact much like its substrate under layer and show no splitting. However, the painting film easily scratches off the substrate substance.

The present invention overcomes the difficulties of the prior art. The present invention solves these problems by using the various coating methods such as pad printing, screen printing, hand painting, and spray with an elastomeric gel protective coating to protect the painting image on the surface of the substance.

SUMMARY OF THE INVENTION

A durable and stretchable painting film allows a designated image upon the substrate of thermoplastic elastomeric articles. The film also provides a top coating to form a durable and scratch resistant elastomeric gel with a designated image upon the substrate of the thermoplastic elastomeric articles. The coating adheres to an article with pad printing, screen printing, hand painting, and spraying. The elastomeric gel paint coating contains resins, pigments, solvents, plasticizers, and additives. Furthermore, the elastomeric gel protective coating contains resins, cyanoacrylate, solvents, plasticizers and additives. The paint coating can have other interesting colors and effects provided by fluorescent ink, glitter powder, thermochromic ink, and glow-in-the-dark pigments. There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

It is an object of the present invention to provide the elastomeric paint coating by varying the ingredients of formula to form the soft, flexible and stretchable painted image on the surface of elastomeric compounds. It is another object of the present invention to use top coat treatment to provide an elastomeric protective coating by varying the ingredients of formula to form a soft, flexible and scratch resistant protective layer on a painted image on the surface of elastomeric compounds. It is an additional object of the present invention to provide the elastomeric paint and protective coating by pad printing, screen printing, brushing and spraying.

It is an object of the present invention to provide the elastomeric paint coating by varying the ingredients of a formula to form the soft, flexible and stretchable painted image on the surface of elastomeric substrates.

It is another object of the present invention to use a top coating to provide an elastomeric protective coating by varying the ingredients of the formula to form a soft, flexible, and scratch resistant protective layer upon a painted image on the surface of an elastomeric substrate.

A further object of the present invention is to provide the elastomeric paint and protective coating by pad printing, screen printing, brushing, and spraying.

Numerous objects, features and advantages of the present invention will be readily apparent to those of ordinary skill in the art upon a reading of the following detailed description of the presently preferred, but nonetheless illustrative, embodiment of the present invention. Before explaining the current embodiment of the invention in detail, it is to be understood that the invention is not limited in its application to the details of construction and to the arrangements of the components set forth in the following description. The invention is capable of other embodiments and of being practiced and carried out in various ways. Also, the phraseology and terminology employed herein are for the purpose of description and should not be regarded as limiting.

Further objects and advantages of the subject invention will be apparent to those skilled in the art. These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the descriptive matter in which there is described a preferred embodiment of the invention.

DETAILED DESCRIPTION OF THE INVENTION

The present invention includes an elastomeric paint applied on the surface substrate, and followed by a top coat treatment of an elastomeric gel protective coating. The composition of the elastomeric paint contains styrenic block copolymer, mineral oil, solvents, pigments, and additives. However, the composition of elastomeric protective coating has additional alkyl cyanoacrylate for scratch resistance. The coating applies upon the gel paint by pad printing, screen printing, and spraying methods.

Styrenic Block Copolymer

The coating composition is composed of one or more resins, mostly as pellets or crumbs. The resins must dissolve in a suitable solvent or a mixture of solvents. As a main component of the invention, the resins form the elastic film and serve as the carrier for the coloring material used in the coating composition. The selection and combination of the resins determine the utilization of the coating area and the resulting properties: adhesion to various substrates, grades of gloss, and scratch resistance. With the present invention, varying the amount and types of polymers affects the features of coating composition. For example, preferably using triblock, radical block and/or multiblock copolymers, and optionally a diblock copolymer, the printing ink, which has desirable rheological properties, will produce a durable and stretchable elastic film. The polymers used comprise at least one copolymer selected from the radical block and multiblock copolymers. This invention contains at least two thermodynamically incompatible segments, one hard and one soft. In general, in a triblock polymer, the ratio of the segments is one hard, one soft, and one hard or an A-B-A copolymer. The multiblock and radical block copolymer can contain any combination of hard and soft segments. In the optional diblock copolymer, the blocks are sequential with respect to hard and soft segments.

Commercially available thermoplastic rubber type polymers are especially useful in forming the compositions of the present invention. Kraton Chemical Company and Septon Company of America sell commonly used polymers. The most common structure is the linear ABA block type such as styrene-butadiene-styrene (SBS) and styrene-isoprene-styrene (SIS) which is the Kraton D rubber series. Kraton G is another type of polymer preferred for this invention. The copolymer includes a styrene-ethylene-butylene-styrene (S-EB-S) structure. The optionally blended diblock polymers include the AB type such as styrene-ethylene-propylene (S-EP) and styrene-ethylene-butylene (S-EB), styrene-butadiene (SB) and styrene-isoprene (SI). Septon resins are available in either diblock (A-B) or the more common triblock (A-B-A) types. These include a hydrogenated poly-isoprene (S-EP, S-EP-S), a hydrogenated poly-isoprene/butadiene (S-EEP-S) polymer or a hydrogenated poly-butadiene (SEBS) polymer. Depending on the hardness of the surface of elastomeric substrate, various combinations of triblock and radical block in the paint composition are necessary.

Another polymer is chlorinated polyolefin. Commercially available chlorinated polymers are especially useful in forming the compositions of the present invention. Du Pont Company and Nippon Paper Chemicals sell commonly used chlorinated polyolefin. The preferred chlorinated polyolefin compounds are Hypalon CP 826 and Superchlon 830 mws.

The paint and protective coating compositions preferably include resins from about 1% to 12% by weight, more preferably from about 5% to 10% by weight, and still preferably from about 6% to 8% by weight.

Cyanoacrylate

Cyanoacrylates are typically clear, high shear strength adhesives that form an instant bond to a wide variety of surfaces. Cyanoacrylates also form clear, tough, plastic coatings. These coatings provide gloss, scratch resistance, chemical resistance, electrical resistance, and improved structural performance. Cyanoacrylate coatings are generally methyl or ethyl cyanoacrylate-base. Other cyanoacrylates of commercial importance include 2-propyl, n-butyl, and allyl esters. All of these monomers are clear, colorless, low viscosity liquids with pungent odors. The relative benefits and limitation of various types of cyanoacrylate monomers make them appropriate for different applications. Formulation of the protective elastomeric gel coating containing cyanoacrylate causes difficulty because of 1) the sensitivity of cyanoacrylate to contaminants, 2) the extreme reactivity of the cyanoacrylate curing mechanism, 3) compatibility between elastomeric gel and cyanoacrylate, 4) solubility parameter between elastomeric gel, solvent and cyanoacrylate, and 5) the dissolving effect of solvent and cyanoacrylate on the surface substrate.

Mineral Oil

Mineral oil is a highly refined, colorless, and odorless petroleum oil. A preferred mineral oil to mix with thermoplastic rubber of the invention is white mineral oil, generally recognized as safe for contact with human skin. Mineral oil, characterized in terms of its density and viscosity, has a light mineral oil of relatively less viscous than heavy mineral oil.

Light mineral oils are preferred for the invention. Mineral oils are available commercially in both USP and NF grades. USP mineral oils have viscosities that range from 35 to 125 cSt and pour points that range from $-12°$ C. to $-20°$ C. NF light mineral oils have lower viscosities, typically 3 to 30 cSt, and pour points as low as $-40°$ C. The mineral oil may be of technical grade, having a viscosity ranging from 4-90 cSt and a pour point ranging from $-12°$ C. to $2°$ C. Examples of commercially available suitable mineral oils include Sonneborn® and Carnation® white oils from Witco, Isopar® K and Isopar® H from ExxonMobil, and Drakeol®, Draketex®, Parol® white mineral oils from Penreco Company. The amount of mineral oil in the paint and protective coating should range from about 10% to about 30% by weight based on the total weight of pad printing ink components, preferably from about 15% to about 25% by weight.

Solvents

Solvents differ in their evaporation rates and strengths. The amount of solvent in paints has a major effect on its solvency, drying rate, spraying speed, and adhesion to a substrate. Solvents function as retarders and thinners. Retarders serve when printing speed is slow and when a paint system dries extremely fast. Functioning as diluents in the corresponding paints system, thinners are a mixture of solvents. Mixing paints with thinners in the correct ratio to achieve the desired viscosity is extremely important. The viscosity of the final mixture determines the effectiveness of the elastic coating film transfer. The type and amount of solvents will depend on the resins and pigment used in the paint system. In some cases, the surface substrates also play a role in determining the solvent to be used. The physical evaporation process of the paint induces the drying of elastomeric film on substrate. At the same time the surface substrate of thermoplastic rubber compound partially dissolves, the slight dissolution of the coating surface results in a direct bond between the paints and the substrate.

In general, the commercial styrenic thermoplastic elastomer article has a blend of styrenic copolymer and mineral oil. In the present invention, both the base coat and the top coat use aromatic solvents to increase the adhesion between the elastomeric gel film and the substrate of thermoplastic elastomer products. The very low evaporation rate of glycol ether acetate also reduces the volatility of aromatic solvents. The solvents used include these chemical groups: aromatic hydrocarbons, aliphatic solvent, ester, glycol ether acetate and ketone. For aromatic hydrocarbon solvents, toluene, xylenes, aromatic 100, and aromatic 150 are preferred. In aliphatic solvents, heptane, cyclohexane, hexane, mineral spirits, VM & P are preferred. From the ester group, isopropyl acetate and amyl acetate are preferred. In the glycol ether acetate group, propylene glycol methyl ether acetate, ethylene glycol monoethyl ether acetate and ethylene glycol monobutyl ether acetate are preferred. Lastly, cyclohexanone, diacetone alcohol, and isophorone are preferred from the ketone group.

Preferably compositions of the present invention utilize a combination of aromatic hydrocarbon, aliphatic hydrocarbon, glycol ether acetate and ketone. The paint and protective coating preferably includes solvents from about 80% to about 95% by weight, more preferably from about 85% to about 90% by weight.

Colorants

Colorants provide the color tone of the ink and determine its hiding power. Colorants, either organic pigments or inorganic pigments, color a substrate by altering its reflective characteristics. Hundreds of different types of pigment exist. Nature forms some by mineral or vegetable means, but most are synthetic materials. When ink is applied to a substrate, colorants either remain on the surface or tend to fill voids in irregular surfaces. The present invention contains a coloring agent that produces a desired color, preferably organic pigments. The pigments may include those suitable for use in printing ink as is known in the art. Examples of such pigments include: pigment yellow 83 (C.I. 21108), pigment orange 34 (C.I. 21115), pigment red 48:3 (C.I. 15865:3), pigment violet 23 (C.I. 51319), pigment blue 15:2 (C.I. 74160), pigment green 7 (C.I. 74260), pigment white 6 (C.I. 77891), and pigment 7 (C.I. 77266). In this invention, pigment constitutes about 10% to about 30% by weight, preferably in an amount of about 15% to about 25% by weight.

Additives

The additives, normally used in small quantities, adjust the coating compositions for flow, viscosity, or surface characteristics. Adhesion modifiers, matting powder, anti-foam agent, wetting agent, antioxidant, antistatic agents, and flow control agents are a few examples. However, solvents have the most profound effect on coating performance.

EXAMPLE

A 3% by weight of styrenic block copolymer elastomer, known as Kraton 1652, and 7% by weight of mineral oil are dissolved in an 87% by weight solution of an aromatic 150 in a beaker. After a clear solution was obtained, 3% by weight of blue pigment was added to a paint coating solution, and kept stirring until the pigment dispersed homogeneously. A molded, or hot & melt, styrenic thermoplastic elastomer article was provided. The hardness of molded articles varies from shore 00 to 15 shore A. The paints were applied at the surface substrate by spray applicator.

The protective coating was prepared by mixing a 3% by weight of styrenic block copolymer elastomer, known as Kraton 1652, and 7% by weight of mineral oil then dissolving both in an 87% by weight solution of an aromatic 150 in a beaker. After a clear solution was obtained, 3% by weight of ethyl cyanoacrylate was added and kept stirring until the solution dispersed homogeneously. The protective coating was applied at the painted surface of a substrate by a spray applicator, and after waiting 24 hours a hard film forms with good scratch resistance. The applied paints and protective coating film are then subjected to an Eraser Abrasion Test, a surface coating adhesion test, and stretch tests to determine the adhesion, stretch and scratch resistance features of present paint and protective coating compositions, pursuant to ASTM standards.

From the aforementioned description, an elastomeric paint with protective coating upon styrenic block copolymer articles has been described. The elastomeric paint is uniquely capable of applying and coating an image upon a styrenic substrate without the coating fragmenting upon stretching the substrate. The elastomeric paint and its various components may be manufactured from many materials, including but not limited to, polymers, polyethylene, polypropylene, nylon, and composites.

The invention has been described herein with the reference to certain preferred embodiments. It is understood that obvious variants thereon will become apparent to those skilled in the art. The invention is not to be considered as limited thereto.

As such, those skilled in the art will appreciate that the conception, upon which this disclosure is based, may readily be utilized as a basis for the design of other structures, methods and systems for carrying out the several purposes of the present invention. Therefore, the claims include such equivalent constructions insofar as they do not depart from the spirit and the scope of the present invention.

I claim:

1. A process for forming an elastomeric paint and/or elastomeric protective coating upon a thermoplastic elastomeric substrate forming an article and having a surface structure receptive to receiving at least one selective elastomeric paint coating, said process including:
    said thermoplastic elastic substrate substantially comprising a styrenic block copolymer;
    permanently applying a paint coating composition to the surface structure of a thermoplastic elastomeric substrate article, said elastomeric paint coating composition comprising:
        (a) one or more copolymer resins selected from the group consisting of a tailback, radical block and multiblock copolymer, and optionally a diblock copolymer;
        (b) mineral oil;
        (c) solvents;
        (d) colorants; and,
        (e) additives;
    wherein each of said copolymers contains at least two thermodynamically incompatible segments, selected from the group consisting of:
        (a) styrene-butadiene-styrene polymers;
        (b) styrene-isoprene-styrene polymers;
        (c) styrene-ethylene-butadiene-styrene polymers;
        (d) styrene-ethylene-propylene-styrene polymers;
        (e) styrene-ethylene-butylene-styrene polymers;
        (f) styrene-butadiene polymers; and,
        (g) styrene-isoprene polymers;
    wherein said copolymers comprise between about 5% to 10% by weight of the elastomeric paint coating composition;
    wherein said mineral oil comprises between from about 5% to 15% by weight of said elastomeric paint coating composition;
    wherein said solvents comprise aromatic and aliphatic solvents, said aromatic solvents including toluene, xylene, aromatic 150 and aromatic 100, and said aliphatic solvents including heptane, cyclohexane, mineral spirits and VM & P, said solvents comprising between about 80% to about 90% by weight of the elastomeric paint coating composition;
    wherein said elastomeric paint coating composition includes pigments comprising at least one of luminescent pigment, fluorescent pigment, and thermochromic pigment, and said comprised between about 3% to 8% by weight of the elastomeric paint coating composition;
    wherein said at least one additive selected from the group consisting of adhesion modifier, matting powder, antistatic agent, defomer, wetting agent, antioxidant, anti-ultraviolet agent, and a fragrance, and said additives being added to adjust the coating composition for flow, viscosity, and surface characteristics; and
    applying said elastomeric protective coating onto the top coat treatment of the thermoplastic elastomeric article, wherein said elastomeric protective coating comprises:
        (a) one or more copolymer resins selected from the group consisting of a tailback, radical block and multiblock copolymer, and optionally diblock copolymer;
        (b) an alpha cyanoacrylate;
        (c) mineral oil;
        (d) solvents; and,
        (e) additives; and
    wherein said elastomeric paint and elastomeric protective coating furnishing protection to the imprinted article to provide scratch resistance and allow stretching of the article during its usage.

2. The process of claim 1, wherein each of said copolymers contains at least two thermodynamically incompatible segments, and is selected from the group consisting of styrene-butadiene-styrene polymers, styrene-isoprene-styrene polymers, styrene-ethylene-butadiene-styrene polymers, styrene-ethylene-propylene-styrene polymers, and styrene-ethylene-butylene-styrene polymers.

3. The process of claim 1 wherein said copolymers of said elastomeric protective coating comprise between about from about 5% to about 15% by weight.

4. The process of claim 1 wherein said alkyl cyanoacrylate is selected from the group consisting of methyl, ethyl, propyl, butyl cyanoacrylate, or mixtures thereof.

5. The process of claim 1 wherein the amount of alkyl cyanoacrylate comprises between about 2% to about 6% by weight.

6. The process of claim 1 further wherein said solvents comprise aromatic and aliphatic solvents:
   said aromatic solvents including toluene, xylene, aromatic 150 and aromatic 100; and,
   said aliphatic solvents including heptane, cyclohexane, mineral sprits and VM & P.

* * * * *